US010200885B2

(12) United States Patent
Vasavada et al.

(10) Patent No.: US 10,200,885 B2
(45) Date of Patent: Feb. 5, 2019

(54) SATELLITE COMMUNICATION RANGING

(71) Applicant: Hughes Network Systems, LLC, Germantown, MD (US)

(72) Inventors: Yash M. Vasavada, Gaithersburg, MD (US); Yezdi Antia, North Potomac, MD (US)

(73) Assignee: Hughes Networks Systems, LLC, Germantown, MD (US)

(*) Notice: Subject to any disclaimer, the term of this patent is extended or adjusted under 35 U.S.C. 154(b) by 110 days.

(21) Appl. No.: 15/152,602

(22) Filed: May 12, 2016

(65) Prior Publication Data
US 2017/0332252 A1 Nov. 16, 2017

(51) Int. Cl.
H04B 7/185 (2006.01)
H04W 24/02 (2009.01)

(52) U.S. Cl.
CPC ............ H04W 24/02 (2013.01); H04B 7/185 (2013.01)

(58) Field of Classification Search
CPC ..... H04W 24/02; H04W 88/04; H04W 84/18; H04W 84/06; H04W 74/08; H04W 52/02; H04W 52/24; H04W 52/243; H04W 52/241; H04W 52/248; H04W 72/08; H04W 72/04; H04W 72/082; H04W 72/0473; H04W 72/0453; H04L 43/16; H04L 12/26; H04L 5/00; H04L 5/0048; H04L 1/0643; H04L 1/0606; H04L 1/0625; H04L 1/0668; H04B 7/185; H04B 7/18519; H04B 7/18521; H04B 7/18513; H04B 7/0626; H04B 7/18534; H04B 7/06; H04B 7/18545; H04B 7/18563

USPC ......... 370/328, 316, 311, 326; 455/98, 12.1, 455/427, 63.1, 296, 430, 456.1, 522, 14, 455/13.4
See application file for complete search history.

(56) References Cited

U.S. PATENT DOCUMENTS

| 6,226,521 | B1 * | 5/2001 | Liu ...................... H04B 7/2123 455/12.1 |
| 6,904,017 | B1 * | 6/2005 | Meempat .......... H04L 29/06027 370/238 |
| 7,221,312 | B2 * | 5/2007 | Yee ...................... G01S 5/0215 342/357.59 |
| 8,634,778 | B1 * | 1/2014 | Dale .................... H04W 52/16 455/522 |
| 9,325,409 | B1 * | 4/2016 | Branlund ................ H04B 7/212 |
| 2001/0045903 | A1 * | 11/2001 | Chang .................. G01S 5/0054 342/357.43 |

(Continued)

Primary Examiner — Andrew W Chriss
Assistant Examiner — Rasha Fayed
(74) Attorney, Agent, or Firm — Bejin Bieneman PLC

(57) ABSTRACT

A telecommunications system includes a plurality of ranging terminals programmed to communicate with a plurality of satellites over a plurality of frequencies. A processor, having a memory, is programmed to receive ranging data from each of the plurality of ranging terminals, determine a plurality of power levels for each of the plurality of terminals, and transmit the plurality of power levels to each of the plurality of ranging terminals. Each power level is associated with one of the plurality of frequencies. The plurality of ranging terminals is programmed to transmit signals to the plurality of satellites over the plurality of frequencies in accordance with the power levels determined by the processor.

8 Claims, 4 Drawing Sheets

(56) References Cited

U.S. PATENT DOCUMENTS

| | | | |
|---|---|---|---|
| 2003/0058163 A1* | 3/2003 | Zimmerman | G01S 5/009 342/357.72 |
| 2003/0112878 A1* | 6/2003 | Kloper | H04B 7/18547 375/259 |
| 2006/0022870 A1* | 2/2006 | Zimmerman | G01S 5/0009 342/464 |
| 2007/0066233 A1* | 3/2007 | Smith | H01Q 1/1257 455/67.11 |
| 2007/0184849 A1* | 8/2007 | Zheng | H04B 7/06 455/456.1 |
| 2007/0216575 A1* | 9/2007 | DiEsposti | G01S 19/252 342/357.64 |
| 2009/0117854 A1* | 5/2009 | Davis | H04W 52/146 455/69 |
| 2009/0262014 A1* | 10/2009 | DiEsposti | G01S 19/05 342/357.42 |
| 2010/0234071 A1* | 9/2010 | Shabtay | H04B 7/0408 455/562.1 |
| 2011/0007646 A1* | 1/2011 | Miller | H04B 7/18513 370/252 |
| 2011/0007647 A1* | 1/2011 | Miller | H04B 7/18586 370/252 |
| 2011/0143654 A1* | 6/2011 | Mukhija | H04B 7/18513 455/9 |
| 2013/0250889 A1* | 9/2013 | Kim | H04L 5/001 370/329 |
| 2014/0004789 A1* | 1/2014 | Rozmaryn | H04B 17/40 455/9 |
| 2016/0302207 A1* | 10/2016 | Vasavada | H04W 72/082 |

* cited by examiner $$r_{(N \times M) \times 1} = A_{(N \times M) \times (N+M)} \times d_{(N+M) \times 1}$$

FIGURE 4

SATELLITE COMMUNICATION RANGING

BACKGROUND

In certain existing satellite communication systems, the satellite terminal, during its initial installation and commissioning, performs a procedure, subsequently referred to as a ranging procedure, to determine the nominal transmit power setting for the uplink transmission. This nominal transmit power depends on the nominal value of end-to-end channel gain and the total noise plus interference level (the greater the channel gain, the lesser the required transmit power. On the contrary, the greater the noise and interference, the greater the required transmit power).

During the ranging, the satellite terminal transmits the ranging signal at one frequency. Based on a received power level or Signal to Noise Ratio (SNR) level of the ranging signal received at the satellite gateway, the satellite terminal determines a nominal transmit power level.

In certain existing satellite communication systems, spectral density, or level, of noise plus interference is assumed to be identical across all frequencies. The certain existing satellite communication systems assume that the spectral density is flat across all inroute frequencies. As a result, the nominal transmit power level estimated at the ranging frequency is used with respect to other inroute frequencies.

BRIEF DESCRIPTION OF THE DRAWINGS

FIG. 4 illustrates a relationship between various matrices directed to measured range data, interference floor values, and terminal offset values.

DETAILED DESCRIPTION

Figure 1:
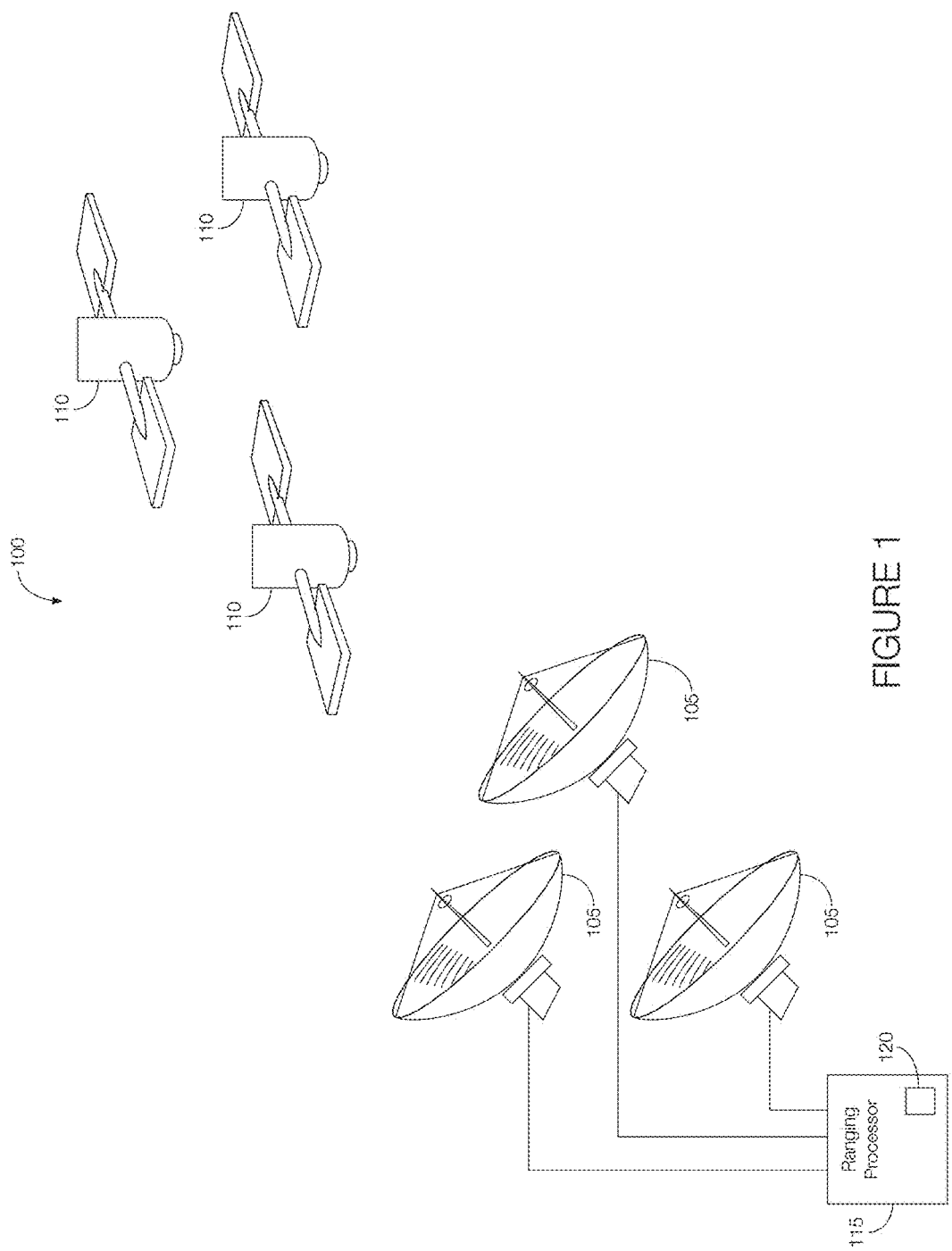
FIG. 1 illustrates an example telecommunications system with multiple satellites in communication with multiple terminals over multiple frequencies.

In some satellite communication networks, the satellite gateway (GW) outroute transmissions (i.e., transmission from the GW to the user terminals via the satellite) can interfere with inroute transmissions (i.e., transmission from the user terminals to the GW via the satellite). The inroute transmissions from the user terminal are affected by thermal noise effects. In addition, the presence of outroute interference results in an increase in the spectral floor due to impairments. The level of the interference can vary with varying center frequencies and bandwidths of the outroute signals. This interference affecting a given inroute frequency typically does not vary significantly over time.

Due to variation of noise and interference floor, it may be necessary to perform multi-frequency ranging in which the ranging is performed at more than one inroute frequencies by a given terminal.

As the ranging process, especially when performed at more than one inroute frequency, is time consuming and satellite link resource consuming, it is beneficial if not all the terminals are required to perform the multi-frequency ranging. To meet this objective, the satellite Gateway determines the variation of the interference floor across different inroute frequencies. Subsequently, Gateway broadcasts a table containing this frequency-dependent interference floor variation on the outroute. A terminal that receives this information on the outroute needs to perform only the conventional, single-frequency, ranging; it can use the broadcast interference table to determine the transmit power level for the rest of the inroutes. This disclosure proposes a method using which the Gateway can determine the variation of the interference floor across different inroute frequencies.

Two-fold challenges in this estimation problem are as follows: (i) a certain limited number of terminals perform the multi-frequency ranging (the rest use the single-frequency ranging combined with the interference floor table broadcast from the GW). Multi-frequency ranging process at each of the terminals is affected by a terminal-specific perturbation, which arises because of the satellite beam gain variation at different locations of these terminals, satellite channel gain variations (e.g., due to weather) at these terminals, terminal hardware specific variations, etc. (ii) Furthermore, to reduce the overhead due to multi-frequency ranging, each of the terminal that performs this process ranges only a small subset of the entire set of inroute frequencies. This subset is also terminal-specific; different terminals may range on different subsets of inroute frequencies. Due to (i) and (ii) above, the collection of measurements obtained by different terminals at the end of multi-frequency ranging form a partial overlapping subsets of measurements, where each subset is affected by a different unknown random variable.

The task at the Gateway of determining a single table containing the interference floor variations across inroutes using these multiple overlapping subsets of ranging measurements is solved by the present disclosure. Alternative/prior approaches that address this concern are (i) a locked reference method, and (ii) a floating reference method. In the locked reference method, ranging occurs at a particular frequency that is ideally the same for all terminals. This way, terminal location dependent and/or terminal hardware-specific measurement offsets (that affect and impair the estimation of the system-wide static interference floor) can be detected and compensated for. In the floating reference method, different terminals may perform the ranging at different frequencies, which allows for more flexibility during ranging. In this method, the terminal location dependent and/or terminal hardware-specific differences are compensated for by designating the measurements from certain terminals which are collected with a strong signal quality as the reference.

While the locked reference and floating reference methods, discussed above, can provide adequate estimates of appropriate power levels, those methods suffer from certain drawbacks. For instance, both are heuristically applied and are ad-hoc in nature. They may both discard data which increases the amount of variance in their respective power estimations. Finally, both these methods require certain system level assumptions that can constrain the flexibility in the terminal-driven ranging process. In a scenario in which these assumptions are not met, these methods may fail to provide the desired estimates of the frequency-specific interference floor levels.

One alternative approach is an optimized linear estimator model, described in greater detail below. When applied to a telecommunications system, the optimized linear estimator model is implemented via a processor executing instructions stored in a memory. The instructions include receiving ranging data from multiple ranging terminals, determining power levels for each terminal, and transmitting the power levels to the terminals. Each power level is associated with at least one frequency. The ranging terminals are programmed to transmit signals to the satellites in accordance with the power levels for each frequency determined by the processor.

Development of the optimized linear estimator model may rely on various parameters including, e.g., the number of inroute frequencies N, the number of terminals M that perform controlled ranging, A parameter $c_n$ that represents the interference floor affecting $n^{th}$ inroute as n varies from 1 to N, the terminal specific offset $k_m$ present in the $m^{th}$ terminal's ranging data as m varies from 1 to M, and the ranging data $r_{m,n}$ measured on the $n^{th}$ inroute by the $m^{th}$ terminal. One relationship between these parameters is shown below in Equation (1).

$$r_{m,n} = c_n + k_m + u_{m,n} \tag{1}$$

where the expression $u_{m,n}$ represents the noise affecting the measurement of n-th inroute at m-th terminal.

The ranging data $r_{m,n}$ in Equation 1 is the normalized ranging power required to achieve the target energy per symbol to noise power spectral density ($E_s/N_o$). This is modeled as the sum of the parameter of interest $c_n$, a terminal-specific nuisance parameter $k_m$, and the measurement noise $u_{m,n}$, all in decibels. Note that the parameter $k_m$ accounts for the variations from terminal to terminal (indexed by m) in the path loss, the return beam contour level, and (e.g., weather-induced) shadowing and fading.

Figure 3:
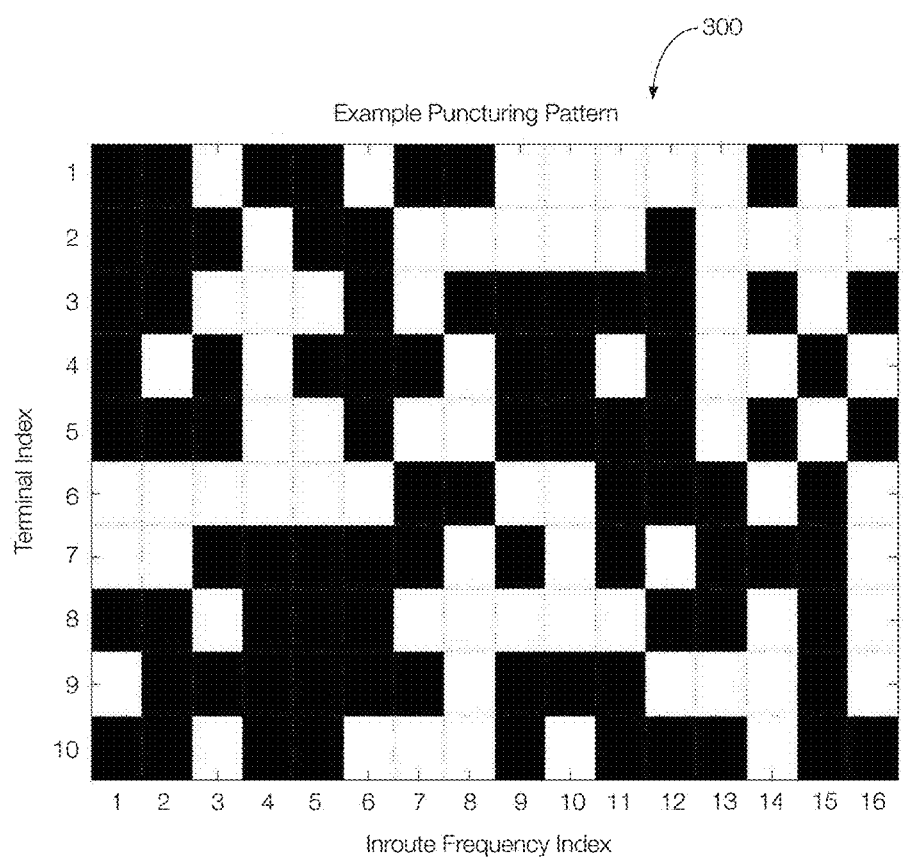
FIG. 3 is an example sample puncturing pattern 300 that illustrates which terminals performed ranging processes at particular frequencies.
Figure 4:
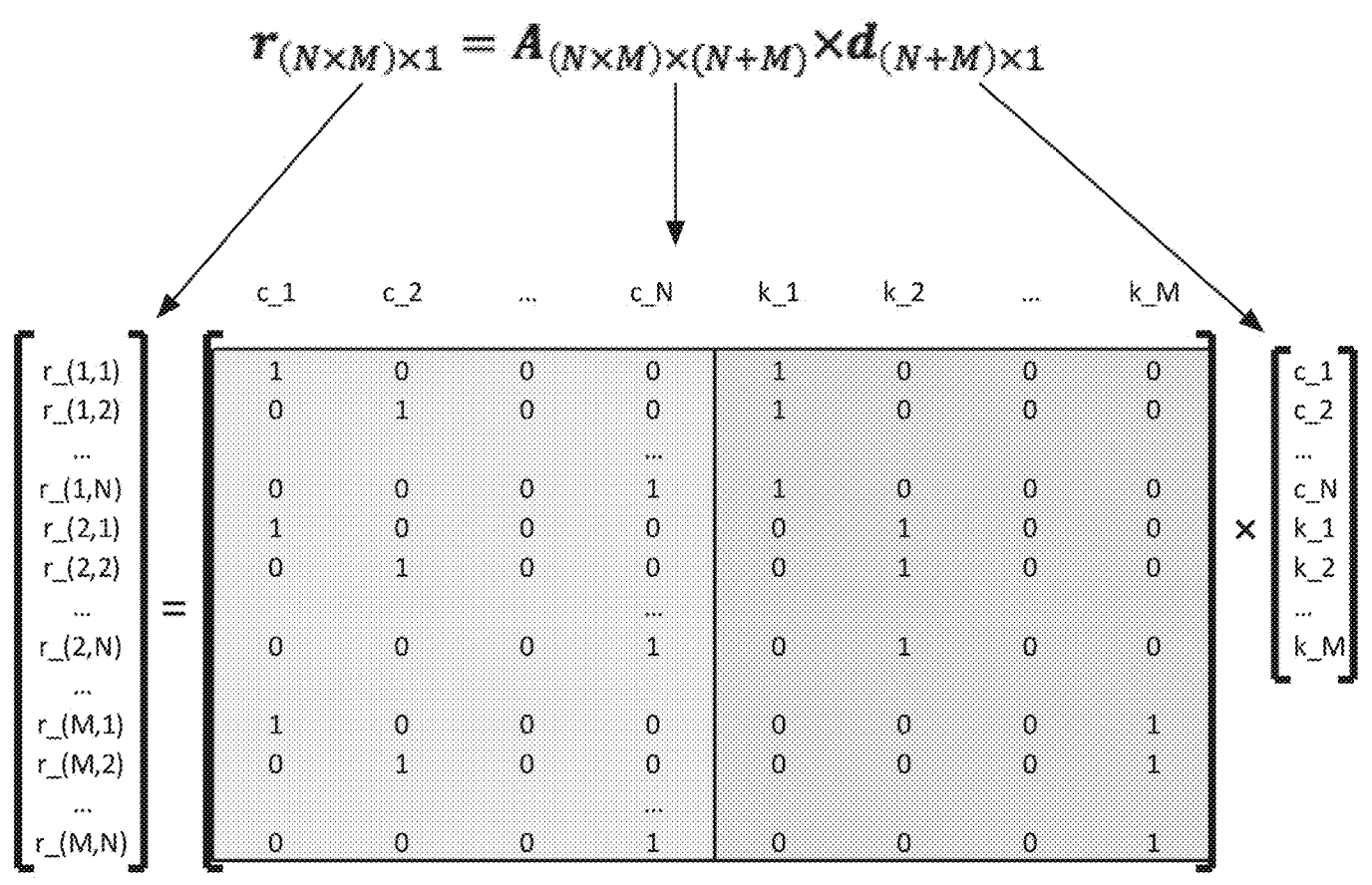

The ranging process obtains the measurement $r_{m,n}$ in a sparse manner; i.e., $r_{m,n}$ is not obtained for all pairs of inroutes (m) and terminals (n), an example of which is shown in FIG. 3. The data (i.e., the $r_{m,n}$ values) from multiple terminals can be aggregated into a matrix R, whose rows equal the number of inroutes and columns equal the number of terminals. A vectorial form r of matrix R is shown in FIG. 4. This vector r is obtained by stacking rows of R and taking the transpose of the stacked rows. Also shown and discussed below with regard to FIG. 4 is the vector d, which includes various unknowns associated with each ranging. An adjacency matrix A and a diagonal matrix W, examples of both of which are also shown in FIG. 4, are used to determine the values of the unknowns shown in vector d.

The adjacency matrix A may be sparsely populated. Any row of A may have only two nonzero unit-valued entries that define the adjacency between the corresponding c and d parameters. The diagonal matrix W is a matrix of confidence metrics corresponding to the measurement vector r. If an element of the measurement vector r is trustworthy, the corresponding diagonal element of matrix W is set to be near unity. If an element of r is unavailable, corresponding diagonal element of W is set to zero. In general, diagonal elements of W are set in a range from 0 to 1 and are made proportional to the reliability or quality of the corresponding element of vector r. In further generality, matrix W can be made non-diagonal and set to the covariance of the measurement noise, if available.

The unknown vector d and the measurements r are related by the adjacency matrix A. The columns of the adjacency matrix A are not independent. Removing one of N different k parameters shortens the unknown vector d by one element and removes the corresponding column of the adjacency matrix A. This shortened matrix equation can be represented as shown in Equation (2).

$$r_{(N \times M) \times 1} = A_{(N \times M) \times (N+M-1) \times 1} \times d_{(N+M-1) \times 1} \tag{2}$$

Although the nomenclature has not changed, the number of columns of the adjacency matrix A has been reduced by one, as has the number of elements of the unknown vector d. Thus, the measured ranging data can be represented by the following simplified equation:

$$r = A \times d \tag{3}$$

Given Equation (3), the unknown vector d can be determined with a given measurement matrix r. That is, if the adjacency matrix A is an invertible square matrix, the solution may be obtained by multiplying the inverse of the adjacency matrix A with the measurement matrix r. However, in general, the adjacency matrix A is a rectangular non-invertible matrix. Therefore, one solution is to use a Weighted Least Squares approach.

The Weighted Least Squares estimate of the unknown vector d may be represented as follows:

$$\hat{d} = (A^T W A)^{-1} A^T W r \tag{4}$$

The first N elements of the estimated vector $\hat{d}$ above represent the estimated c parameters. The remaining M−1 elements represent estimates of the terminal-specific k parameters. The terminal-specific k parameters can be used to derive the statues of, e.g., weather conditions at the terminal at the time the ranging occurred.

The disclosed optimal linear estimator model incorporates all ranging measurements, which reduces ambiguity. Moreover, it compensates for issues such as weather conditions at different terminals since it separately captures the k parameter, which captures the terminal specific perturbations that affect measurement of all inroutes at a given terminal. The modeled parameter k, however, may not capture conditions in which the terminal's ranging is affected by the weather on a few, but not all, inroutes. In such instances, a rain fade flag, for instance, can be used to discard such measurements if necessary or desired.

The elements shown in the Figures may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Referring now to FIG. 1, the telecommunications system 100 includes multiple ranging terminals 105, multiple satellites 110, and a ranging processor 115.

The ranging terminals 105 include hardware components that facilitate communication with the satellites 110 over a number of different frequencies, also referred to as inroutes. Some components of the terminal are shown in and discussed with reference to FIG. 2. In general, the ranging terminal 105 may transmit signals to, and receive signals from, various satellites 110. The ranging terminals 105 may each be programmed to range on the various satellites 110 at various frequencies. During the ranging, the ranging terminals 105 may collect ranging data on multiple inroutes. The ranging terminals 105 are programmed to output the ranging data to the ranging processor 115. Moreover, the ranging terminals 105 are programmed to receive command signals, from the ranging processor 115, that command the ranging terminals 105 to communicate with the satellites 110 at power levels determined by the ranging processor 115 based on the ranging data.

The satellites 110 include hardware components that facilitate communication with the ranging terminals 105. The satellites 110 are programmed to communicate with the ranging terminals 105, including participating in the ranging process executed by the ranging terminals 105. The satellites 110 may be in the Earth's orbit. Example orbits include a geostationary orbit, low Earth orbit, or the like. The satellites 110 may each be programmed to transmit signals at various frequencies to various ranging terminals 105.

The ranging processor 115 includes circuits and other hardware components that receive and process the ranging data generated by the ranging terminals 105. In some possible approaches, the ranging processor 115 is incorporated into a Gateway. The ranging processor 115 is programmed to receive the ranging data from the ranging terminals 105, determine various power levels for each ranging terminal 105 and for each inroute frequency, and transmit the power levels to the ranging terminals 105 with a command for the ranging terminal 105 to communicate with the satellite 110 according to the determined power levels. The power levels may be specific to particular ranging terminals 105, target satellites 110, and frequencies. Thus, the power level for one ranging terminal 105 to communicate with a particular satellite 110 may be different from the power level for a different ranging terminal 105 to communicate with the same satellite 110. Further, the power level for a ranging terminal 105 to communicate with one satellite 110 may be different from the power level for that same ranging terminal 105 to communicate with a different satellite 110. In another example, the power level for a ranging terminal 105 to communicate with a satellite 110 over one inroute frequency may be different than the power level for the same ranging terminal 105 to communicate with the same satellite 110 but over a different inroute frequency.

The ranging processor 115 is programmed to consider various ranging data to develop the power levels. The ranging processor 115, for instance, is programmed to estimate the interference floor values and the terminal offset values. The ranging processor 115 may be programmed to aggregate the interference floor values, and the terminal offset values further discussed below with reference to FIG. 4. The ranging processor 115 is programmed to determine the measured range data according to those aggregated values, and the power levels from the measured range data.

The ranging processor 115 may incorporate a memory 120, which is hardware for electronically storing data. The memory 120 may store, e.g., ranging data, power levels, or both. Moreover, the memory 120 may store instructions executable by the ranging processor 115. The instructions may include the instructions executed by the ranging processor 115 associated with receiving and processing the ranging data, determining the power levels, and commanding the terminals to communicate in accordance with the determined power levels.

Figure 2:
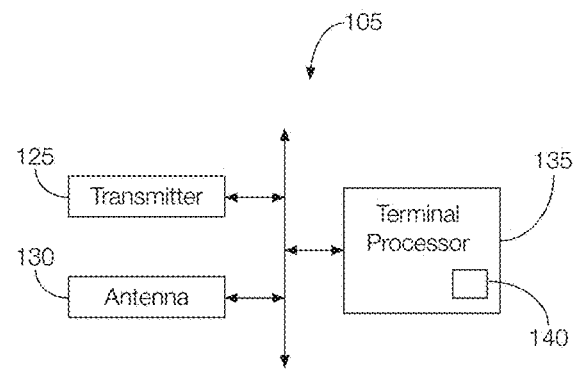
FIG. 2 is a block diagram showing example components of one of the terminals.

FIG. 2 illustrates example components of a ranging terminal 105. As shown, the example components include a transmitter 125, an antenna 130, and a terminal processor 135.

The transmitter 125 may be implemented via hardware circuits or other hardware components that generate signals to be transmitted to one or more satellites 110. For instance, the transmitter 125 may generate signals at various frequencies that can be transmitted to the satellites 110. The signals may be generated in accordance with commands received form the processor. The commands may identify particular power levels for the particular frequency and target satellite 110. Thus, the terminal is programmed to generate the signals according to the power level commanded by the processor. The signals generated by the transmitter 125 may be output to the antenna 130.

The antenna 130 may include hardware that can be used to broadcast signals, generated by the transmitter 125, to the satellites 110. For instance, the antenna 130 may include hardware that converts signals received from the transmitter 125 into radio waves at particular frequencies. The antenna 130 broadcasts the signals to the satellites 110 at the power levels commanded by the processor.

The terminal processor 135 includes circuits and other hardware components that control operation of the transmitter 125, the antenna 130, or both. The terminal processor 135 may include a terminal memory 140 that can electronically store data associated with, e.g., the power levels determined by the ranging processor 115 and instructions for the transmitter 125 and antenna 130 to transmit signals according to the power levels determined by the processor. The terminal processor 135 may access data stored in the terminal memory 140 and output signals, including commands, to the transmitter 125 to generate signals according to the power levels determined by the ranging processor 115.

FIG. 3 is an example sample puncturing pattern 300 that illustrates which terminals performed ranging processes at particular frequencies. Each white space indicates that the ranging process was performed. Each black space indicates that the ranging process was not performed at that terminal on the given inroute. As shown in FIG. 3, the terminal identified by index number 1 ranged on inroute frequencies 3, 6, 9-13, and 15. The terminal identified by index number 6 ranged on inroute frequencies 1-6, 9-10, 14, and 16. A row with all white blocks would indicate that a particular terminal ranged on all inroute frequencies. A column with all white blocks would indicate that all terminals ranged on a particular inroute frequency. Conversely, a row with all black blocks would indicate that a particular terminal has not ranged on any in route frequencies. A column with all black blocks would indicate that none of the terminals ranged on a particular inroute frequency.

None of the rows and columns shown in FIG. 3 are completely filled with white or black blocks, indicating that some ranging data is available for each terminal and each inroute frequency. The collected ranging data can be used to determine power levels for each terminal at each inroute frequency. For instance, the ranging data for each terminal can be processed to determine, e.g., the terminal-specific offset value $k_n$ and the parameter $c_m$ of interest that models the inroute-specific interference floor. Thus, by way of example, even though only three terminals (i.e., the terminals with index numbers 6, 7, and 9) have ranged on inroute frequency 1, and their ranging process measurements were affected by different terminal-specific offsets values (specifically, $k_6$, $k_7$ and $k_9$), although these three ranging measurements are not directly useable (due to presence of these offsets), enough information may be available from the entire set of measurements (represented by the white cells) to determine and separate the interference floor values $c_m$ that affect different inroute frequencies from the terminal-specific offset values that may have affected the ranging processes performed by different terminals.

FIG. 4 illustrates a relationship between various matrices used to collect the measured ranged data, interference floor values, and the terminal offset values at different inroute frequencies. For instance, the ranging data, such as the ranging data collected in concert with generating the puncturing pattern 300 of FIG. 3, can be represented in the various matrices shown in FIG. 4. Three vectorial representations are shown in FIG. 4. The vectorial representations are based on the terms of Equation (2), discussed above, where the vector r represents the ranging data and the vector d represents various unknown interference floor values (i.e., the c parameter discussed above) and unknown terminal offset values (i.e., the k parameter discussed above). The adjacency matrix A, as discussed previously, relates the unknown vector d to the ranging data r. Thus, with respect to Equation (4) above, the unknown vector d can be solved for using, e.g., a weighted least squares technique. Specifically, the unknown c parameters and k parameters can be determined. With all of the unknowns addressed, the power levels for each of the terminals communicating at each inroute frequency can be determined and applied.

Figure 5:
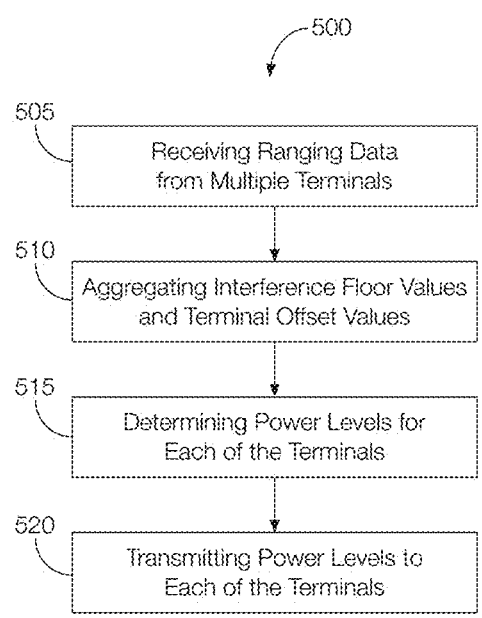
FIG. 5 is a flowchart of an example process that may be executed by a processor incorporated into the telecommunications system of FIG. 1.

FIG. 5 is a flowchart of an example process 500 that may be executed by the ranging processor 115. The process 500 may be executed at any time after at least some of the terminals have ranged on at least some of the frequencies. The process 500 may be executed once initially to provide power levels to each terminal, and then repeated occasionally as more terminals have had the occasion to range on more frequencies. Thus, the process 500 may be repeated as additional ranging data becomes known.

At block 505, the ranging processor 115 receives ranging data from the terminals. The ranging data is affected by the interference floor values, terminal offset values, measured noise, etc. Further, the ranging data may further include other information such as an identification of the terminal from which the data originated, the particular inroute frequencies ranged upon, the date and time of the ranging, the weather conditions associated with the ranging, or the like.

At block 510, the ranging processor 115 aggregates the ranging data received from each terminal. Aggregating the data may include aggregating known interference floor values, aggregating known terminal offset values, aggregating known noise values, etc. For instance, aggregating the ranging data may include generating a puncturing pattern such as the example one shown in FIG. 3, parts of the matrix shown in FIG. 4, including the values shown in the vector r and the adjacency matrix A, or both.

At block 515, the ranging processor 115 determines the relative interference floor levels for different inroute frequencies. Determining the interference levels may include determining the values of the unknown vector d using, e.g., a weighted least squares function such as that shown and discussed above with respect to Equation (4). In other words, the ranging processor 115 may use to extract, from the data collected during actual ranging processes performed by the various terminals, the unknown interference floor values (e.g., the c parameters in the adjacency matrix A) and the unknown terminal offset values (e.g., the k parameters in the adjacency matrix A). The estimated c parameter values can be used to determine the power levels for each terminal to communicate over each inroute frequency even though each terminal may not have ranged on each inroute frequency.

At block 520, the ranging processor 115 transmits the power levels to each of the terminals. This way, the ranging processor 115 can communicate the particular power levels that each terminal should apply depending on the inroute frequency used to communicate with a particular satellite 110. The terminals may operate according to the power levels determined by the ranging processor 115.

The process 500 may repeat at various intervals or in response to various events, such as when a change is made to the telecommunication system. Examples of events may include adding, removing, or replacing a satellite 110, adding, removing, or replacing a terminal, communicating over different inroute frequencies, a terminal ranges on a different inroute frequency, or the like. By periodically repeating the process 500, the power levels may be continually updated. Moreover, because the power levels are based on a process that considers the entirety of measurements collected during actual ranging processes performed by the various terminals (no data is discarded from each ranging process performed), the process 500 estimates power levels that are most likely to be successful.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A telecommunications system comprising:
a first ranging terminal and a second ranging terminal, each programmed to communicate with a plurality of satellites over a plurality of frequencies, wherein the first ranging terminal is programmed to perform a ranging process at a first frequency and wherein the second ranging terminal is programmed to perform a ranging process at a second frequency; and
a processor having a memory and programmed to receive ranging data from each of the ranging terminals, determine a first power level for the first ranging terminal operating at the second frequency based on the ranging process performed by the second ranging terminal and determine a second power level for the second ranging terminal operating at the first frequency based on the ranging process performed by the first ranging terminal, and transmit the first power level to the first ranging terminal and the second power level to the second ranging terminal,
wherein the first ranging terminal is programmed to transmit signals to the plurality of satellites in accordance with the first power level when the first ranging terminal is operating at the second frequency and wherein the second ranging terminal is programmed to transmit signals to the plurality of satellites in accordance with the second power level when the second ranging terminal is operating at the first frequency.

2. The telecommunication system of claim 1, wherein the ranging data received from each of the ranging terminals is affected by an interference floor value associated with one of the plurality of frequencies.

3. The telecommunication system of claim 2, wherein the ranging data received from each of the ranging terminals is affected by a terminal offset value associated with one of the ranging terminals.

4. The telecommunication system of claim 3, wherein the processor is programmed to aggregate the interference floor values and terminal offset values received from each of the ranging terminals.

5. The telecommunication system of claim 4, wherein the processor is programmed to determine, using the measured range data, the aggregated interference floor values and aggregated terminal offset values.

6. The telecommunication system of claim 5, wherein the processor is programmed to determine the power levels from the measured range data.

7. The telecommunication system of claim 3, wherein the ranging data received from each of the ranging terminals includes a noise value.

8. The telecommunication system of claim 7, wherein the processor is programmed to determine, using the measured range data, the aggregated interference floor values, aggregated terminal offset values, and aggregated noise values.

* * * * *